United States Patent
Szekely

[15] 3,678,786
[45] July 25, 1972

[54] VARIABLY CONTROLLED PLANETARY DRIVE STRUCTURE AND METHOD

[72] Inventor: Otto E. Szekely, Palm Beach, Fla.
[73] Assignee: Power Flo Products Incorporated, Hialeah, Fla.
[22] Filed: Oct. 12, 1970
[21] Appl. No.: 79,875

[52] U.S. Cl. .................................. 74/782, 74/724, 74/710
[51] Int. Cl. ................... F16h 3/44, F16h 37/06, F16h 1/38
[58] Field of Search ............................................ 74/782, 724

[56] References Cited

UNITED STATES PATENTS

| | | | |
|---|---|---|---|
| 3,397,597 | 8/1968 | Szekely | 74/782 |
| 3,399,742 | 9/1968 | Malick | 192/84 R |
| 3,444,970 | 5/1969 | Clark et al. | 192/84 R |
| 3,540,296 | 11/1970 | Hostutler | 74/782 X |

Primary Examiner—Arthur T. McKeon
Attorney—Whittemore, Hulbert & Belknap

[57] ABSTRACT

The planetary drive structure includes a variable speed transmission by which the drive structure speed is universally variable in both forward and reverse directions. The drive structure also includes selectively engageable power takeoff structure. The variable speed feature of the transmission is effected by means of a sun gear and a ring gear having planet gears positioned therebetween and means for varying the resistance to rotation of the sun gear. The means for varying the resistance to rotation of the sun gear may be hydraulically or electrically energized and includes selectively operable accessory drive structure. The method of the invention includes the step of varying the speed of a hydraulic transmission in planetary drive structure in both forward and reverse directions substantially universally over the range of speeds thereof, selectively actuating accessories through the variable speed transmission and selectively actuating power takeoff means with the planetary drive structure.

6 Claims, 5 Drawing Figures

INVENTOR.
OTTO E. SZEKELY
BY Whittemore
Hulbert & Belknap
ATTORNEYS

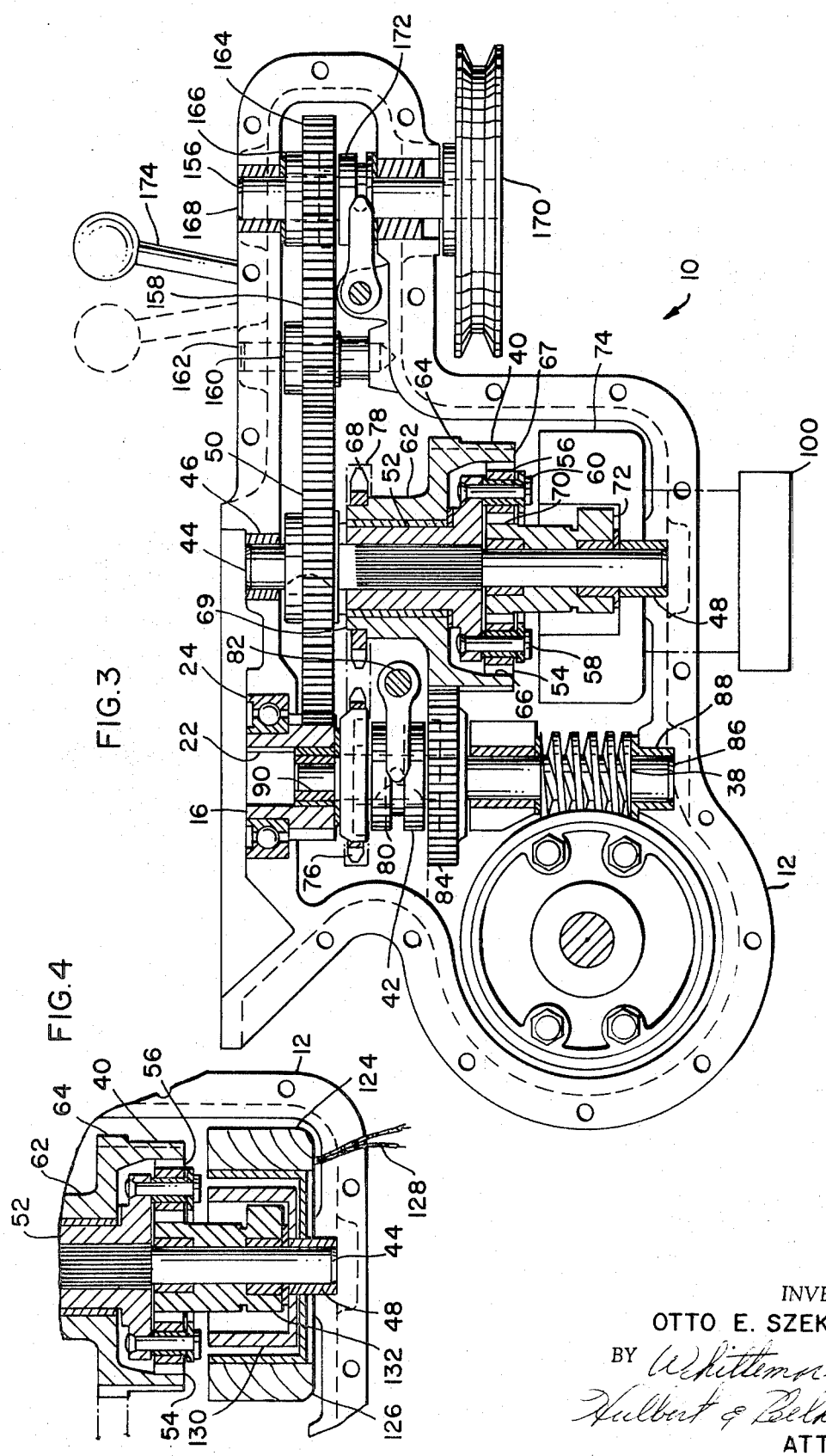

Patented July 25, 1972

INVENTOR.
OTTO E. SZEKELY

BY *Whittemore*
*Hulbert & Belknap*
ATTORNEYS

VARIABLY CONTROLLED PLANETARY DRIVE STRUCTURE AND METHOD

CROSS REFERENCE TO RELATED APPLICATIONS

The present invention is an improvement over the invention disclosed and claimed in applicant's U.S. Pat. No. 3,397,597.

BACKGROUND OF THE INVENTION

1. Field of the Invention

The invention relates to planetary drive structures and methods and refers more specifically to a planetary drive structure, the speed of operation of which may be universally variably controlled in both a forward and reverse direction by a hydraulically or electrically actuated variable speed transmission and which planetary drive structure includes mechanical and hydraulic or electric power takeoff means or accessory drive structure and the method of operation thereof.

2. Description of the Prior Art

In the past, relatively simple drive structures for use, for example, in lawn mowers, golf carts and the like have often been capable of transmitting torque from a motor to output shafts such as axles or the like only at a single speed and often only in a single direction. Wherein a variable speed drive structure operable in one or more directions has previously been provided in such structures, the mechanism providing the variable speed has been complicated and therefore often inefficient and too expensive for many purposes.

In the past, relatively small planetary drive structures have usually not included external mechanical power takeoff structure. Wherein power takeoff structure has been provided on such drive structure of the past, it has usually been mechanical rather than hydraulic, electric or the like and variable speed operation for the power takeoff has not been possible. Thus, accessories for devices using the planetary drive structures of the past have normally been operated manually or, if actuated automatically, they have usually been operated from a separate power system and usually at a single fixed speed.

SUMMARY OF THE INVENTION

The planetary drive structure of the invention includes a variable speed transmission positioned between an input or drive shaft and output or driven shafts and means for reversing the direction of rotation of the output shafts in relation to the input shaft. There is also provided a mechanical power takeoff structure in the planetary drive structure of the invention and structure driven by the variable speed transmission for operating accessories at variable speed.

The method of the invention includes universally variably driving a pair of output shafts of a planetary drive structure from an input shaft thereof in opposite directions over a considerable range of drive speeds, selectively actuating mechanical power takeoff structure by the planetary drive structure and selectively actuating variable speed accessory drive structure by a variable speed transmission of the planetary drive structure.

BRIEF DESCRIPTION OF THE DRAWINGS

FIG. 3 is a longitudinal section view of the planetary drive structure illustrated in FIG. 1 taken substantially on the line 3—3 in FIG. 1.

FIG. 4 is a partial longitudinal section view of a modification of the planetary drive structure of the invention similar to the section view shown in FIG. 3 and illustrating modified transmission means for varying the speed of the planetary drive structure.

DESCRIPTION OF THE PREFERRED EMBODIMENTS

Figure 1:
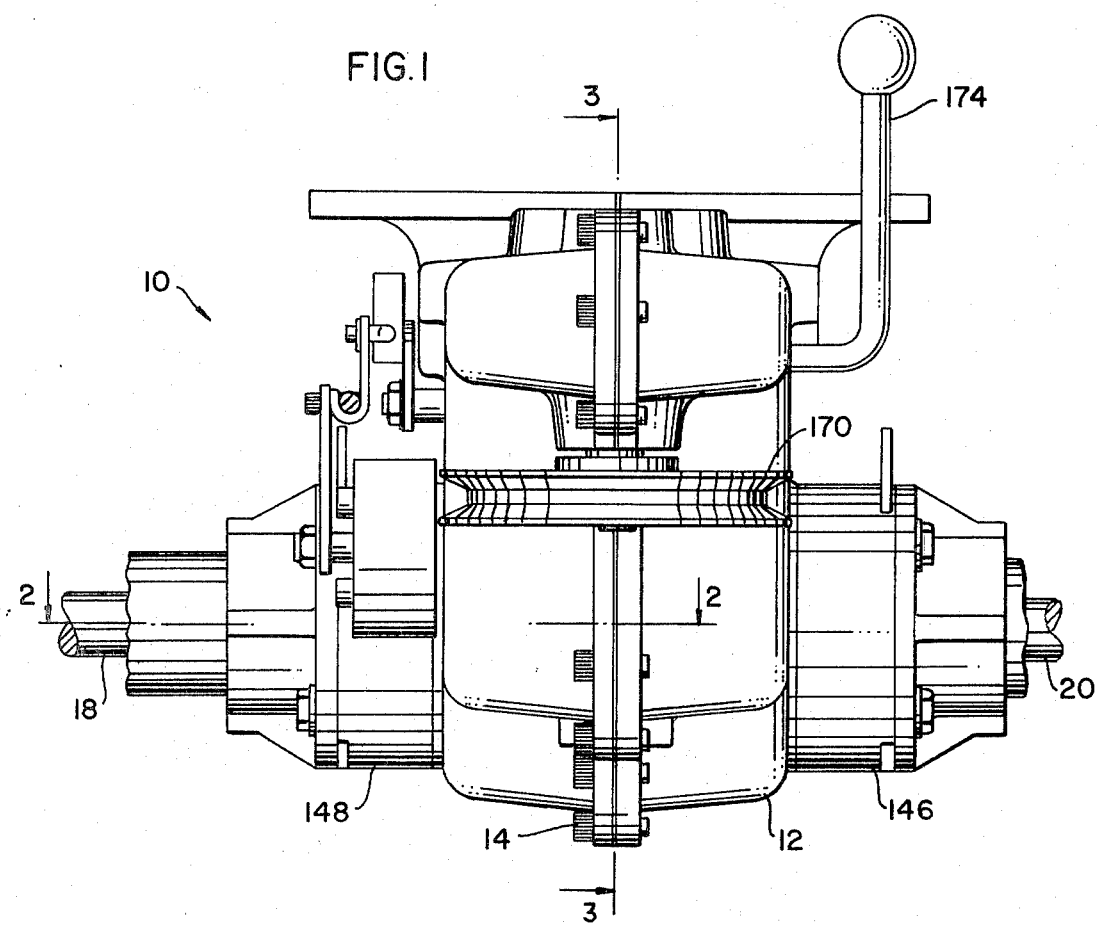
FIG. 1 is a front elevation view of the planetary drive structure of the invention.

As shown best in FIG. 3, the planetary drive structure 10 of the invention includes a housing 12 which is split longitudinally and secured together by the bolts 14, the input or driving spur gear 16 and the driven or output shafts 18 and 20 which may be, for example, axles of a vehicle. The spur gear 16 includes the recess 22 for receiving a driving shaft operable to rotate the spur gear 16 in the bearings 24 secured in the housing 12.

Figure 2:
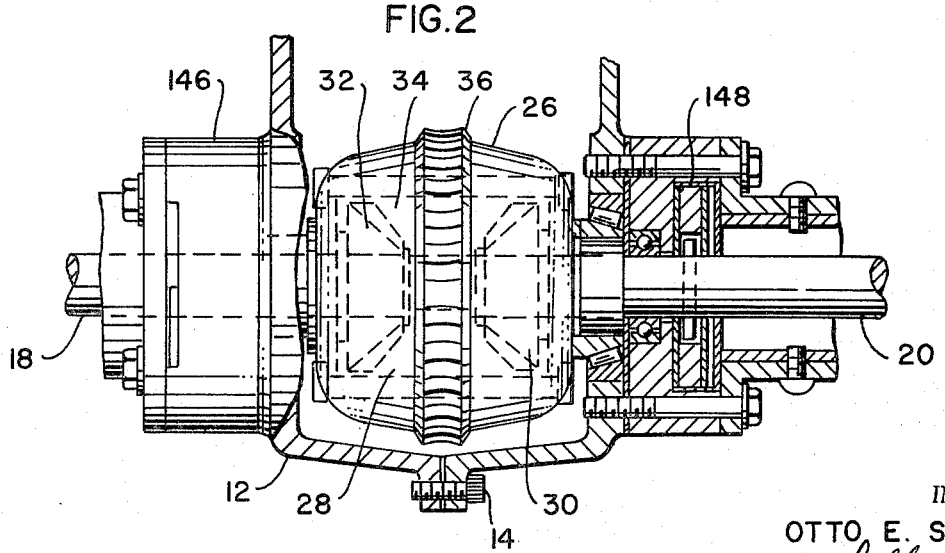
FIG. 2 is a partial section view of the planetary drive structure illustrated in FIG. 1 taken substantially on the line 2—2 in FIG. 1.

As shown best in FIG. 2, the output shafts 18 and 20 are secured to differential drive structure 26 including the rotatably mounted bevel gears 28, 30, 32 and 34. The bevel gears 28, 30, 32 and 34 are differentially driven through the worm gear 36 by the worm 38 which is engaged therewith and which is best shown in FIG. 3.

A variable speed transmission 40 and reversing structure 42 are provided between the spur gear 16 and the worm 38 to produce rotation of the worm 38 in opposite directions on rotation of the spur gear 16 in a single direction and to provide variable speed rotation for the worm 38 in relation to the spur gear 16 over a substantial speed range.

More specifically, the variable speed transmission 40 includes a shaft 44 rotatably mounted in bearings 46 and 48 at the opposite ends thereof. The spur gear 50 is keyed to the shaft 44 and in mesh with the spur gear 16 to rotatably drive the shaft 44 on rotation of the spur gear 16.

A spider 52 is splined to the shaft 44 for rotation therewith. Planet gears 54 and 56 are secured to the spider 52 for rotation therewith, and relative thereto on pins 58 and 60.

The hollow sleeve 62 is rotatably mounted on the spider 52 and includes the spur gear portion 64 positioned centrally thereof, and the internal ring gear portion 66 at the enlarged end 67 thereof. The sprocket 68 is secured to the other end 69 of the sleeve 62 as shown best in FIG. 3.

The sun gear 70 engaged with the planet gears 54 and 56 is rotatably mounted on the shaft 44 of transmission 40 as shown best in FIG. 3. An eccentric cam 72 rigidly connected to the sun gear 70 is also rotatably mounted on the shaft 44 as shown. Cam 72 forms part of the hydraulic system 74 shown in more detail in FIG. 5 for varying the speed of the transmission 40 as will be considered subsequently in the discussion of the hydraulic system 74.

In operation of the transmission 40, the spur gear 50 is rotated to rotate the shaft 44 and therefore the spider 52 splined thereto. On rotation of the spider 52, the planet gears 54 and 56 are caused to rotate about the axis of the shaft 44 and in addition will rotate about the axis of the pins 58 and 60 an amount depending upon the ability of the sun gear 70 and the ring gear 66 to rotate relative to each other.

If the sun gear 66 is permitted to freely rotate, the planet gears 54 and 56 will walk around the ring gear 66 and cause no movement of the sleeve 62 and therefore no drive through either the spur gear 64 or the sprocket 68. Power is transmitted through the planet gears 54 and 56 to the spur gear 64 and sprocket 68 in accordance with the resistance to rotation of the sun gear 70 and since the sun gear 70 is secured to the cam 72, power is transmitted through the planet gears in accordance with the resistance to rotation of the cam 72 offered by the hydraulic system 74 of FIG. 5.

Figure 5:
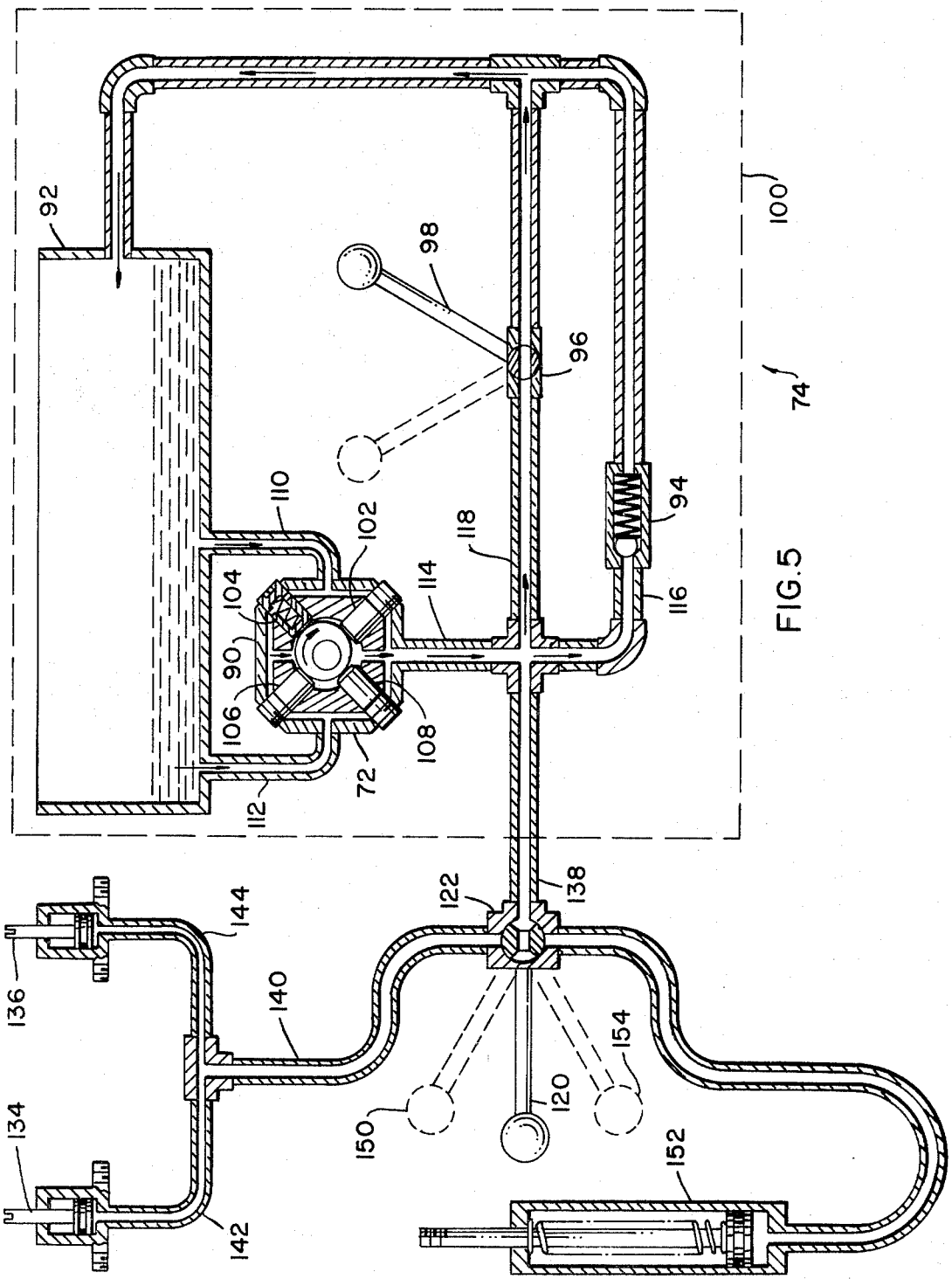
FIG. 5 is a diagrammatic representation of the hydraulic system for varying the speed of the planetary drive structure illustrated in FIGS. 1–3 and for variably driving accessories therefrom.

The hydraulic system of FIG. 5 includes a pump 90, the fluid reservoir 92, check valve 94 and a flow control throttle valve 96 which throttle valve is actuated by the speed control lever 98 connected as shown in FIG. 5. In assembly, the pump 90, hydraulic reservoir 92, check valve 94 and throttle valve 96 are all included in the same housing 100 together with the connecting lines therebetween.

In operation of the hydraulic system 74, the eccentric cam 72 of the pump rotates to reciprocate the spring biased pistons 102, 104, 106 and 108 to pump fluid from the reservoir 92 through the pump input lines 110 and 112 into the pump output line 114. The hydraulic fluid in the line 114 divides between hydraulic lines 116 and 118 in accordance with the position of the speed control lever 98 with the accessory control lever 120 in a position to close the distribution valve 122.

With the valve 96 fully open, a minimum of resistance or pressure head is applied to the pump 90 and therefore resistance to the cam 72 is a minimum. When the speed control lever 98 is rotated in the opposite direction to its limiting position and the valve 96 closed, a maximum pressure head and therefore a maximum of resistance to the cam 72 is provided by the check valve 94.

Since the cam 72 is rigidly connected to the sun gear 70 and the sun gear is in mesh with the planet gears 54 and 56 which are in turn in mesh with the internal ring gear 66 on the sleeve 62, and since the speed at which the sleeve 62 is rotated for any particular speed of rotation of the shaft 44 is determined by the resistance to rotation of the sun gear 70 in accordance with whether the sun gear rotates or the planet gears 54 and 56 walk around a stationary sun gear in the extremes and the relative movement thereof between these two extremes, the ultimate rotation of the output shafts 18 and 20 resulting from a particular rotation of the spur gear 16 may be controlled by the position of the speed control lever 98. Control of the speed of rotation of the output shafts 18 and 20 may therefore be universal over the entire speed range of the transmission 40.

It will be understood that while a particular hydraulic pump 90 has been illustrated, that other pumps, hydraulic or actuated by another medium such, for example, as a rotary pump wherein the impeller vanes are secured to the sun gear 70 for rotation therewith may be substituted for the pump 90.

In addition, as shown best in FIG. 4, other devices offering a continually variable resistance, over a substantial range of resistance, to rotation of a member thereof, which member is connected to the sun gear 70 for rotation therewith, may be substituted for the hydraulic system 74. For example, in FIG. 4 an electrically operated slip clutch 124 is substituted for the pump 90.

In such structure the stationary coil 126 is variably energized through conductors 128 by known electrical controls to vary the resistance to rotation of the movable armature 130. The movable armature 130 is connected by means of the gear 132 to the sun gear 70 for rotation therewith.

The rotation of the sleeve 62 on rotation of the shaft 44 will be controlled in accordance with the electrical signal applied through the conductors 128 which may be controlled in accordance with a speed control lever associated with the planetary drive structure 10. It will be understood that other such variable control structures are contemplated and that the hydraulic pump 90 and electric slip clutch 124 are disclosed only as examples of devices which provide infinitely variable relative output between two rotating members.

In addition to providing a variable speed drive for the planetary drive structure 10, the hydraulic control system 74 may be used for operation of accessories in conjunction with the planetary drive structure. For example, the hydraulic brake pistons 134 and 136 may be actuated by hydraulic fluid passed through conduits 138, 140, 142 and 144. The piston and cylinder structures 134 and 136 may be used to operate brake structures 146 and 148 indicated diagrammatically in FIG. 2. Such brake structures are not in themselves part of the invention and will not, therefore, be considered separately in detail.

In operation, if it is desired to actuate the piston and cylinder structures 134 and 136, the speed control lever 98 would be moved to a position to close the valve 96 and the accessory control lever 120 would be moved to a position as, for example, position 150 shown in dash lines in FIG. 5, to open the valve 122 whereby hydraulic fluid from the pump 90 is passed through conduit 138 and into conduit 140. Valve 122 may be arranged to permit release of the brake structures 146 and 148 when the accessory lever 120 is returned to the neutral position thereof as, for example, the position in full lines illustrated in FIG. 5.

Additional accessories may be operated from the piston and cylinder structure 152 on movement of the accessory control lever 120 into the position 154 also illustrated in dash lines in FIG. 5. It would of course be possible to operate the accessories at variable speed by varying the position of lever 120 or with the speed control lever 98 in a position such that the valve 96 is partially open.

The reversing structure 42 includes the sprocket 76, the chain 78 extending between the sprockets 68 and 76, the clutch structure 80 and actuating mechanism 82 therefor and spur gear 84. The sprocket 76 and spur gear 84 are rotatably mounted on the shaft 86 journaled in bearings 88 and 90 in the housing 12 on which the worm 38 is rigidly secured. The clutch mechanism 80 which may be the usual dog-type clutch mechanism is secured to the shaft 86 for axial movement therealong and it is prevented from rotation with respect thereto. The clutch structure 80 is such that when moved into engagement with the spur gear 84 by means of the actuating mechanism 82, the shaft 86 is caused to rotate in one direction, and when the clutch structure 80 is moved into contact with the sprocket 76, the shaft 86 is caused to rotate in the opposite direction.

A mechanical power takeoff structure 156 is provided in conjunction with the planetary drive structure 10 of the invention. The mechanical power takeoff structure 156 as shown includes an idler gear 158 rotatably mounted in housing 12 on bearing 160 secured to shaft 162 and spur gear 164 mounted on bearing 166 secured to the shaft 168, the pulley 170 secured to shaft 168 for rotation therewith and the clutch structure 172 positioned on shaft 168 against relative rotation with respect thereto and for axial movement therealong in accordance with the position of the actuating lever 174.

In operation, on rotation of the gear 50, the gear 158 is caused to rotate on the bearing 160, to thus rotate the gear 164 with which gear 158 is in mesh. Then on movement of the actuating lever 174, to move the clutch structure 172 into engagement with the gear 164 for rotation with the gear 164, the shaft 168 and therefore the pulley 170 secured thereto will be caused to rotate at a speed depending on the speed of rotation of the gear 16 and the gear ratios between the gears 16, 50, 158 and 164. A plurality of different apparatus may be actuated by belt means connected to the pulley 170.

In overall operation of the planetary drive structure 10, when it is desired to drive the output shafts 18 and 20, the gear 16 is rotated by, for example, a shaft secured thereto for rotation therewith and driven by convenient motor means such as an electric motor or internal combustion engine having a rotating output shaft. Gear 50 is thus caused to rotate and rotates the shaft 44 at a fixed speed. The spider 52 is therefore rotated at a predetermined speed.

The rotation of the sleeve 62 relative to the spider 52 is then determined by the resistance of the sun gear 70 to rotation, which resistance may be varied in accordance with the operation of the hydraulic system 74 and in particular in accordance with the position of the speed control lever 98 with the accessory lever 120 in a neutral or closed position. Rotation of the sleeve 62 on rotation of the spider 52 would, for example, be at maximum speed and in the same direction as the spider 52 if the resistance to rotation of the sun gear 70 is such that the sun gear 70 remains stationary and the planet gears 54 and 56 walk around the sun gear 70. At the other extreme, if the sun gear were free to move without resistance, the planet gears 54 and 56 would walk around the ring gear 66, the sleeve 62 would remain stationary and the sun gear 70 would rotate at maximum speed and in the opposite direction with respect to the spider.

In between these two extremes and depending upon the resistance offered by the hydraulic pump 74, both the sleeve 62 and sun gear 70 will rotate on rotation of the spider 52 but at some speed between the two maximum speeds and no speed.

With the sleeve 62 rotating, both the gear 84 and the sprocket 76 will be caused to rotate. Then on actuation of the clutch mechanism 80 to engage either the sprocket 76 or gear 84, forward or reverse rotation of the shaft 86 may be accomplished to produce rotation of the output shafts 18 and 20 through the worm 38 and worm gear 36 of differential structure 26.

Thus, it will be seen that an infinitely variable speed planetary drive structure is provided in which both forward and reverse driving may be accomplished at any speed within the speed range of the drive structure, which drive structure is particularly simple and efficient and therefore economical. In addition, variable speed accessory drive is provided in conjunction with the transmission of the planetary drive structure of the invention along with a mechanical power takeoff which may be selectively actuated.

While one embodiment of the planetary drive structure of the invention has been disclosed in detail along with modifications thereof, it will be understood that other embodiments and modifications, particularly of the variable resistance structure such as the hydraulic pump 90 and electric slip clutch 124, are possible. It is the intention to include all embodiments and modifications thereof which are defined by the appended claims within the scope of the invention.

What I claim as my invention is:

1. Reversible unitary variable speed planetary drive structure comprising an input member, at least one output member, an infinitely variable speed transmission positioned between the input member and output member including a rotatably mounted shaft, a spur gear drive member secured to the shaft and engaged with the input member for rotating the shaft, a spider splined to the shaft for rotation therewith having planetary gears secured thereto in angularly spaced apart relation for rotation about their axis and the axis of the shaft, a sleeve driven member rotatably mounted on the spider, a sprocket secured to one end of the sleeve, an external gear located on the sleeve and an internal ring gear on the sleeve engaged with the planet gears, a sun gear rotatably mounted on the shaft also in engagement with the planet gears and means connected to the sun gear for controlling varying of the resistance to rotation of the sun gear on the shaft for varying the coupling between the drive member and driven member.

2. Structure as set forth in claim 1 wherein the means for controlled varying of the resistance to rotation of the sun gear on the shaft comprises a hydraulic system including a hydraulic pump having cam actuating means connected rigidly to the sun gear, the resistance to rotation of which cam actuating means is controlled in accordance with the pressure head in the hydraulic system applied to the pump.

3. Structure as set forth in claim 2 and further including means for controlled actuation of accessory motor means in accordance with the actuation of the hydraulic pump.

4. Structure as set forth in claim 1 wherein the means for controlled varying of the resistance to rotation of the sun gear on the shaft comprises an electric clutch having a rotor and a stator, the rotor of which is connected to the sun gear.

5. Structure as set forth in claim 1 and further including means for reversing the direction of drive of the output member with respect to the direction of drive of the input member connected in parallel with the variable speed transmission between the input member and output member.

6. Structure as set forth in claim 5 wherein the means for reversing the direction of drive of the output member comprises a second rotatably mounted shaft, a sprocket secured to the shaft against axial movement with respect thereto and connected to the transmission for rotation about the shaft in one direction, a spur gear secured to the shaft against axial movement with respect thereto and for rotation thereabout engaged with the transmission for rotation thereby in a direction opposite the one direction and clutch means movable axially on the shaft and secured thereto against rotation relative thereto engageable with the sprocket and spur gear alternatively to provide rotation of the rotatable shaft in opposite directions on axial movement of the clutch means in opposite directions on the rotatable shaft.

* * * * *